United States Patent
Essebbar

(10) Patent No.: US 8,238,497 B2
(45) Date of Patent: Aug. 7, 2012

(54) DEVICE AND METHOD FOR REDUCING INTERFERENCE IN RECEIVED COMMUNICATION SIGNALS

(75) Inventor: Abderrahman Essebbar, Sophia Antipolis Cedex (FR)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/255,764

(22) PCT Filed: Mar. 11, 2010

(86) PCT No.: PCT/JP2010/054150
§ 371 (c)(1),
(2), (4) Date: Sep. 9, 2011

(87) PCT Pub. No.: WO2010/104159
PCT Pub. Date: Sep. 16, 2010

(65) Prior Publication Data
US 2012/0027142 A1    Feb. 2, 2012

(30) Foreign Application Priority Data

Mar. 11, 2009  (FR) ...................... 09 01132

(51) Int. Cl.
*H04B 1/10* (2006.01)
*H03D 1/06* (2006.01)
(52) U.S. Cl. ....................... 375/346; 375/328
(58) Field of Classification Search ............ 375/232, 375/284, 285, 324, 325, 328, 340, 344, 346, 375/350; 455/63.1, 63.3, 67.13
See application file for complete search history.

(56) References Cited

U.S. PATENT DOCUMENTS

| | | | |
|---|---|---|---|
| 7,623,604 B2 | 11/2009 | Loiseau et al. | |
| 2005/0058232 A1 | 3/2005 | Murakami et al. | |
| 2006/0274866 A1 | 12/2006 | Chang | |
| 2007/0201588 A1* | 8/2007 | Loiseau et al. | 375/346 |
| 2008/0013657 A1 | 1/2008 | Aouine et al. | |
| 2009/0129510 A1* | 5/2009 | Yamamoto et al. | 375/334 |
| 2009/0129523 A1* | 5/2009 | Yamamoto et al. | 375/350 |

FOREIGN PATENT DOCUMENTS

EP   2 048 842 A2   4/2009
(Continued)

OTHER PUBLICATIONS

French Search Report of FR 0901132 dated Oct. 15, 2009.
(Continued)

*Primary Examiner* — Young T. Tse
(74) *Attorney, Agent, or Firm* — Sughrue Mion, PLLC

(57) ABSTRACT

A device (1) for reducing the interference in a received communication signal. The device includes: an adaptive filter (2) which uses a self-reference signal to remove a coherent and stable interfering signal from the received communication signal; a detection module (3) for detecting the existence of the target signal among the received communication signals; and a demodulation module (7) for demodulating the received communication signal when the target signal is detected. Further, this device includes: a noise-classifying device (5) which detects various interfering signals of the received communication signal and determines the classification of the detected interfering signals; and a switching module (6) for selecting the input signal for the demodulation module on the basis of the determination made by the noise-classifying device and the value when the existence of the target signal is detected.

9 Claims, 5 Drawing Sheets

FOREIGN PATENT DOCUMENTS

| | | |
|---|---|---|
| EP | 2 063 540 A1 | 5/2009 |
| FR | 2 846 814 A1 | 5/2004 |
| FR | 2 846 815 A1 | 5/2004 |
| FR | 2 846 825 A1 | 5/2004 |
| FR | 2 859 336 A1 | 3/2005 |
| FR | 2 899 052 A1 | 9/2007 |
| JP | 2005-045314 A | 2/2005 |
| JP | 2005-073163 A | 3/2005 |
| JP | 2005-086779 A | 3/2005 |

OTHER PUBLICATIONS

International Search Report of PCT/JP2010/054150 dated Jun. 15, 2010.

* cited by examiner

FIG. 2A
Prior Art
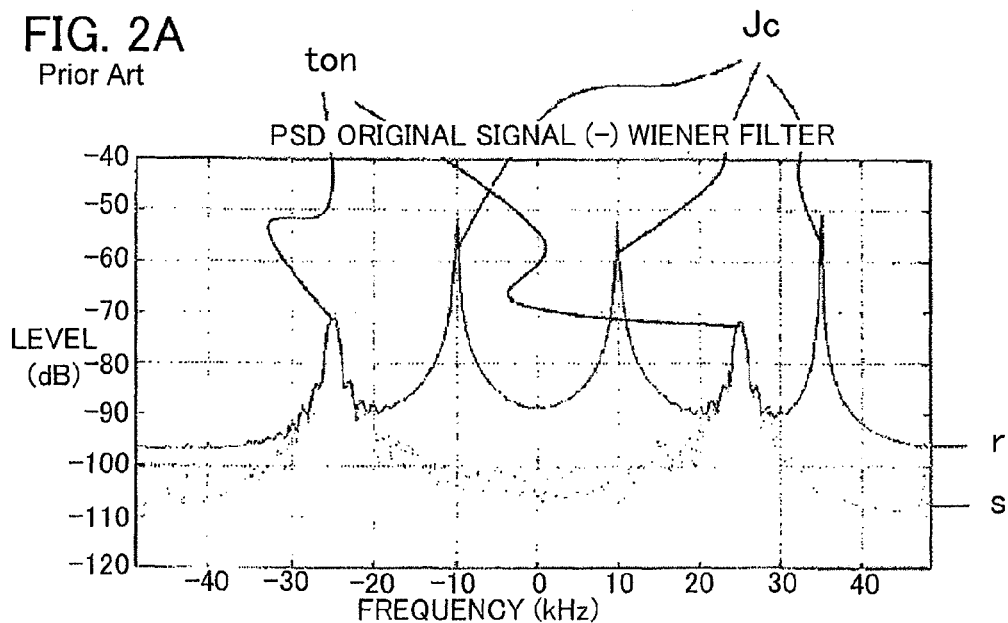
FIG. 2B
Prior Art
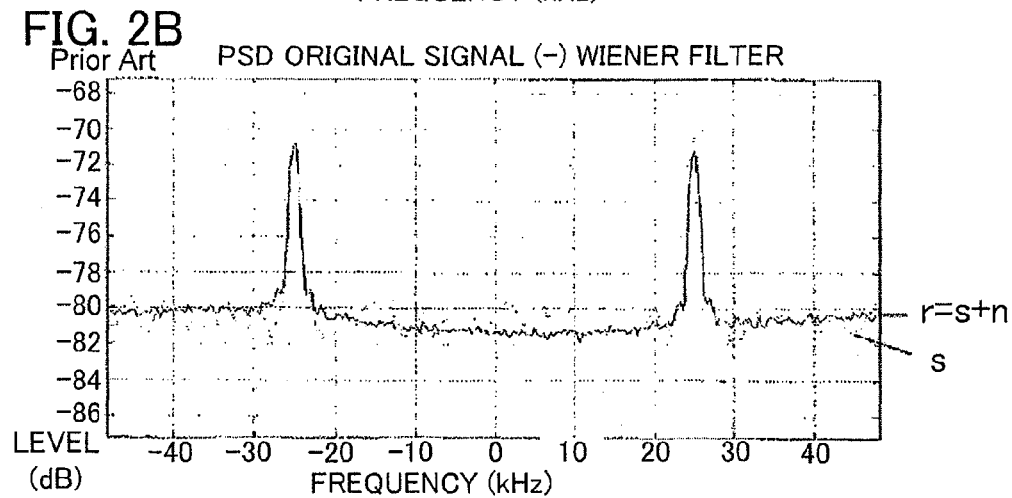
FIG. 3
Prior Art
| | PERFORMANCE OF RECEIVER 20 WITH RESPECT TO ADDITIONAL WHITE NOISE | |
|---|---|---|
| | DATA FILTERED WITH 31 WIENER FILTERS | UNFILTERED DATA |
| SNR(dB) | −2dB | −5dB |

DEVICE AND METHOD FOR REDUCING INTERFERENCE IN RECEIVED COMMUNICATION SIGNALS

CROSS REFERENCE TO RELATED APPLICATIONS

This application is a National Stage of International Application No. PCT/JP2010/054150 filed Mar. 11, 2010, claiming priority based on French Patent Application No. 0901132 filed Mar. 11, 2009, the contents of all of which are incorporated herein by reference in their entirety.

TECHNICAL FIELD

The present invention relates generally to technology composed so as to be used when processing received communication signals. The present invention is particularly suited for processing wireless received signals (for example, remote locking and unlocking signals for a car or a car alarm), but the present invention is not limited to wireless environments. One characteristic of the present invention more particularly relates to an electronic adaptive filter whose purpose is to eliminate interference through processing of this signal when a communication signal is received. The present invention is particularly suited for processing a frequency shift keying (FSK) signal and/or an amplitude shift keying (ASK) signal, but the present invention is not limited to just these two keying schemes.

BACKGROUND ART

Initially, one should bear in mind that existing multiple signal reception systems were analog having uniform complexity, and while these are inexpensive performance is not good in difficult environments. Most of these systems are short-range devices of the RKE (Remote Keyless Entry), SES (Smart Entry System) or TPMS (Tire Pressure Monitoring System) type and do not use digital noise reduction modules through self-referencing.

Furthermore, with background art, devices have been known that reduce interference in received communication signals, from the specifications of French Patent No. 2846814, French Patent No. 2846815, French Patent No. 2859336 and French Patent No. 2846825. Consequently, these are composed so as to use an adaptive filter whose adaptiveness is controlled in accordance with detection of a target signal in a received communication signal.

In addition, from the specification of French Patent No. 2899052, a receiver for removing interference signals from a received communication signal is known, as shown in FIG. 1. A receiver 20 includes an RF analog front-end circuit 22 capable of receiving an input signal RF from an antenna 24. The RF front-end circuit 22 can filter a portion of the received signal and offset the received signal with an appropriate intermediate frequency for analog/digital conversion and for digital processing by a processing circuit 26. The processing circuit 26 includes a signal analog/digital converter, a regulator 28, an adaptive filter 30, a detector 32 for detecting reception of a target signal, and a controller 40 for controlling the operating mode of the adaptive filter 30 in response to signals 36 and 38 transmitted from the detector 32 and a demodulator 34, respectively.

The adaptive filter 30 uses a self-reference signal (a received signal accompanying delay by a delay Δ) used as a reference signal for an adaptive Wiener filter. The self-reference signal has a stable phase relationship with the received signal in the case of coherent interference. This phase is not stable for incoherent interference. The object of the adaptive filter 30 is to effectively remove all components of coherent (and stable) signals other than the target signal. Consequently, the adaptive filter 30 can selective use an adaptive mode when the presence of a target signal is completely undetected or a non-adaptive mode, that is to say a simple filtering mode, when the presence of a target signal is detected, and through this the desired signal is not removed and continues to be demodulated by passing through the filter 30. The expression "target signal" can mean a signal whose reception is desired prior to the nature of the target signal being confirmed. The control circuit 40 is composed so as to generate a control signal 41, and can control the operating mode of the filter 30 in accordance with whether or not the signal 36 from the detector 32 is the target signal and/or whether or not the signal 38 from the demodulator 34 is an effective demodulated signal (that is to say, whether or not the demodulated signal behaves appropriately and follows the transition timing determined by the modulation method).

Within the scope of the present invention, a number of defects have been confirmed in the conventional solution methods.

As an example, the performance of the above-described system is illustrated in FIGS. 2A and 2B. In FIG. 2A, the power spectrum densities of the received signal (r) and the filtering signal (s) are shown. The received signal includes three coherent, stable interference signals ($j_c$) (for example, a Desired/Undesired ratio DU=−10 dB). Looking at the filtering signal (s), it can be seen that an adaptive Wiener filter is suited for coherent interference.

In FIG. 2B, different examples of the received signal (r) and the filtering signal (s) are shown. In this case, the received signal (r) includes a white noise (n) type interference signal accompanied by a −5 dB SNR (signal-to-noise ratio). In FIG. 2B, it can be seen that the noise level is constantly the same as the filtering signal level, and in addition the shape of the second tone changes. The adaptive Wiener filter is not suitable for this kind of noise signal with no time correlation. The table shown in FIG. 3 shows the performance observed in this kind of receiver in the case of additional white noise (incoherent noise). By directly using the received signal (r) for demodulation, performance is improved by around 3 dB compared to using the filtering signal (s). Accordingly, reduction of the self-reference noise is not well suited to incoherent noise and it can be seen that distortion of the message occurs prior to demodulation.

Consequently, on the one hand the performance of the above-described various types of systems for remotely locking and unlocking such as the RICE type is not good in the case of incoherent interference signals such as white noise or pulse noise, while on the other hand it has been confirmed that convergence of the adaptive filter is slow in the case of intermittent interference signals (such as PWM, ASK, AM interference and the like).

In reality, various existing self-reference methods are applied to coherent interference and noise such as interference from the environment, wide-area or TETRA, or to noise such as carport door opening systems, but a noise-reducing adaptive filter for this kind of system is not effective on incoherent noise such as white noise or pulse noise, and distortion of the message occurs through this. Furthermore, with the above-described system, a module for detecting the presence of the target signal on the basis of energy directs an update to the coefficient of the adaptive filter. In the case of intermittent interference, this detection module produces erroneous determinations and halts updating of the filter at the next energy rise. Thus, convergence of the adaptive filter requires more time than in the case of continuous interference.

PRIOR ART LITERATURE

Patent Literature

Patent Literature 1: French Patent No. 2846814
Patent Literature 2: French Patent No. 2846815
Patent Literature 3: French Patent No. 2859336
Patent Literature 4: French Patent No. 2846825
Patent Literature 5: French Patent No. 2899052

DISCLOSURE OF INVENTION

Problems to be Resolved by the Invention

The object of the present invention is to eliminate problems and difficulties encountered with demodulation systems having the prior art technology. In particular, the object of the present invention is to realize an improvable device for reducing interference in received communication signals.

Means to Solve the Problem

With a first aspect of the present invention, the present invention relates to a device for reducing interference signals in received communication signals, this device including:

an adaptive filter using a self-reference signal, for removing coherent and stable interference signals from the received communication signal;

a detection module for detecting the presence of a target signal in the received communication signal;

a demodulation module for demodulating the received communication signal when the target signal is detected;

a control module for the adaptive filter so that the target signal is not sensed and removed by the adaptive filter;

a noise-classifying device for detecting interference signals in the received communication signal, and determining the classification of the detected interference signals; and a switching module for selecting the demodulation module input signal on the basis of the determination of the noise-classifying device and the value detected for the absence or presence of the target signal.

Because an error signal is constantly computed with the output of the adaptive filter, the present invention accelerates convergence of the filter by proposing the addition of a noise-classifying module in order to detect intermittent interference for example of the ASK (Amplitude Shift Keying), AM or PWM (Pulse Width Modulation) type, and/or to cause the system to similarly adapt under the presence of incoherent noise by classifying the various types of coherent or incoherent noise. With this addition, it is possible to cause the demodulation function of the receiver to adapt and to improve such.

With the preferred embodiment of the present invention, the noise-classifying device is composed so as to detect intermittent interference signals, and to supply, when an intermittent interference signal is detected, as output a forced signal so as to accelerate convergence of the adaptive filter. In this manner, convergence of the adaptive filter is accelerated compared to conventional systems.

Preferably, the noise-classifying device compares a smoothed power signal of the received communication signal and a predetermined noise-erasing threshold value, computes the signal difference between two consecutive digital samples and detects the periodicity of the peaks of the intermittent interference signals.

By using one differential (differentiel in French) and the smooth power signal in order to detect intermittent interference, the convergence speed of the filter is accelerated by forcibly acting on the filter, and in this manner it is possible to avoid slow convergence due to intermittent detection.

Preferably, the output of the detection module is forced so as to show that the target signal does not exist, when an intermittent interference signal is detected, and an error signal is supplied at the output of the switching module after convergence of the adaptive filter.

With another preferred embodiment, the noise-classifying device is composed so as to detect incoherent interference signals in the received communication signal, and the demodulation module can adapt in accordance with the determinations of the noise-classifying device.

Preferably, the noise-classifying device computes a power ratio by using two smoothed power signals of the received communication signal and error signal after convergence of the adaptive filter, and determines whether or not an incoherent interference signal exists on the basis of this power ratio.

By introducing a smoothed power signal in a constant ratio in order to classify noise as coherent or incoherent using the received signal and a NLMS, that is to say a Normalized Least Mean Square, signal, it is possible to classify the detected noise by comparison with a constant threshold value. Even other parameters such as the change with time in the coefficient of the adaptive filter can be used by the noise-classifying device.

With another embodiment, the switching module selects a signal used in demodulation after receiving the detected value and the determination of the noise-classifying device.

Preferably, the demodulation module is adapted by modulation specialty parameters on the basis of a signal received from the switching module.

With another embodiment, a control module is provided in order to instruct the operating mode of the adaptive filter in accordance with whether or not the target signal is detected in the received communication signal.

Other characteristics and merits of the present invention will become clear from the following description related to specific embodiments cited as examples, with reference to the attached drawings.

BRIEF DESCRIPTION OF DRAWINGS

FIG. 2A shows a received signal including coherent interference and a corresponding filtering signal obtained by the receiver according to prior art technology.

FIG. 2B shows a received signal including an incoherent interference signal, and a corresponding filtering signal obtained by the receiver according to prior art technology.

FIG. 3 is a table showing the effect on performance relative to the signal-to-noise ratio.

BEST MODE FOR CARRYING OUT THE INVENTION

Figure 1:
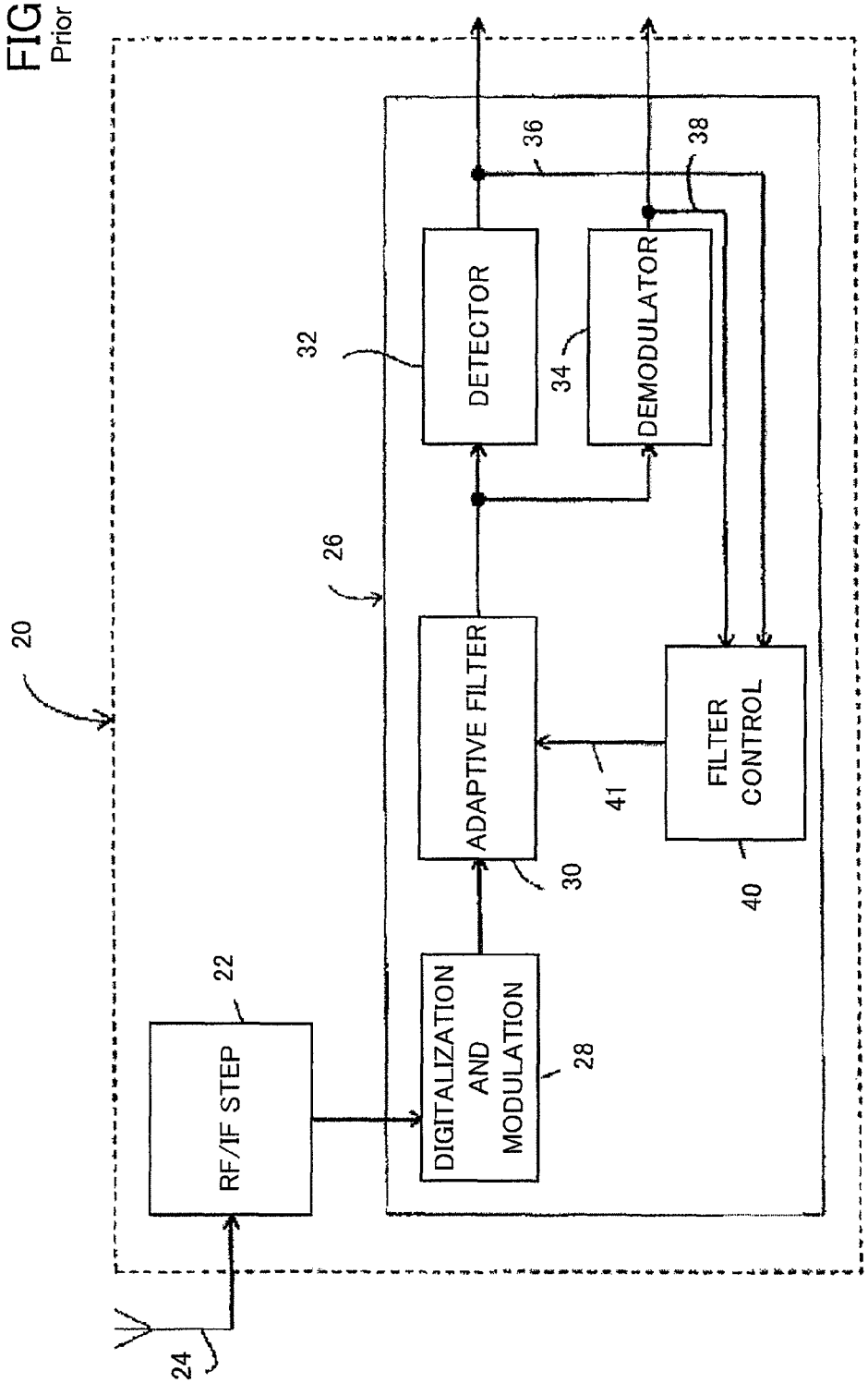
FIG. 1 is a schematic drawing showing a signal receiver using an adaptive filter according to prior art technology.

The relationship with the prior art technology has already been described with reference to FIGS. 1 to 3, and below the present invention is explained simply as an example, and not limiting, with reference to FIGS. 4 to 10.

First, it can be seen that an RF input signal can be received from the antenna through an RF analog front-end circuit, the same as in the case of the above-described receiver of the prior art technology. Following this, the received signal can be offset by an appropriate intermediate frequency with respect to analog/digital conversion, and analog/digital conversion is accomplished by a frequency-reducing digital converter that supplies a complex signal r(t) in the basic passband to a device that reduces interference contained in this signal.

The complex signal r(t) in the basic passband is defined by the following equation at time t.

$$r(t) = s(t) + j_c(t) + j_i(t) + n(t) \quad (1)$$

Here, s(t) means the message of the target signal to be recovered. Moreover, $j_c(t)$ means coherent interference composed of a tone frequency (interference caused by the environment) and wide-area noise (other close-range devices or the like); $j_i(t)$ means intermittent interference composed of discontinuous tone frequencies (PWM, ASK, AM and the like); and n(t) means incoherent noise (white noise, pulse noise and the like).

Figure 4:
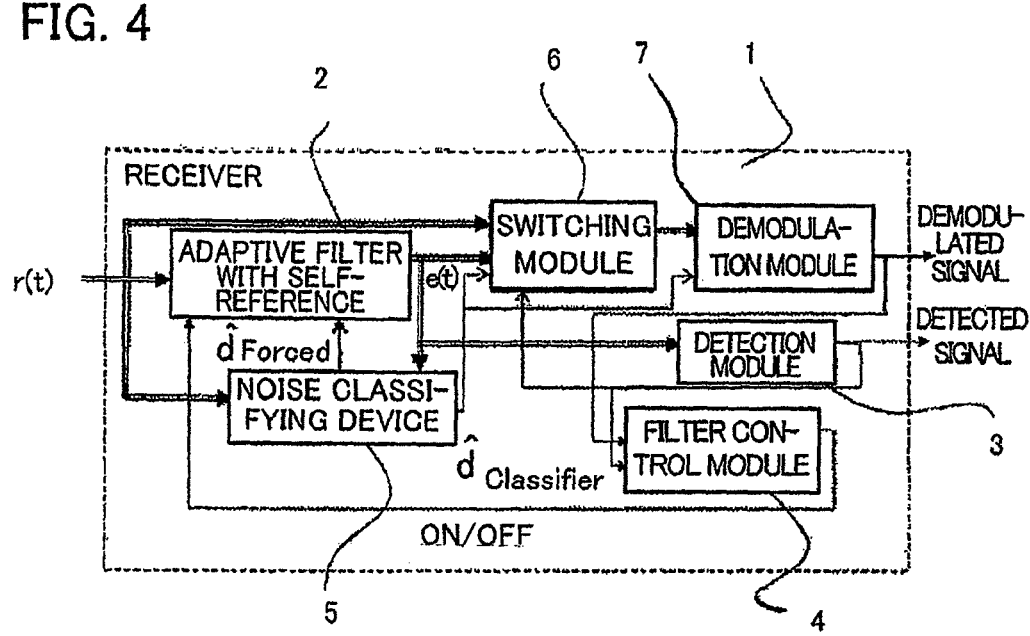
FIG. 4 shows a signal receiver according to an embodiment of the present invention.

FIG. 4 is a summary diagram showing a signal receiver including an adaptive filter, a noise-classifying device and a communication module according to an embodiment of the present invention.

As described above, an intermediate frequency signal sent to the output of the analog part (unrepresented) of the receiver is later processed by a frequency-reducing digital converter so that only the passband of the effective signal is selected. The output of this frequency-reducing digital converter (unrepresented) is a complex data vector r(t) in the basic passband supplied to the device 1.

Similar to the case of the receiver according to the prior art technology, preferably there are an adaptive filter 2 that is a Wiener filter, a detection module 3 and a filter control module 4. Detailed operation of each of these modules can be found by referencing the specifications of the prior art technology cited initially.

The detection module 3 detects whether or not a target signal exists. This is based on fast correlative energy fluctuations. The filter control module 4 operates (turns on) or cancels operation of (turns off) updating of the coefficient of the adaptive filter 2, and accordingly adapts to changes in coherent interference. This control is accomplished on the basis of the phase stability of the signal r(t). If the phase is stable, the signal is identified as being coherent interference and the filter 2 operates so as to eliminate this coherent interference. The control status of the filter is used as input for the adaptive filter for learning and management of the existence of a detected signal, that is to say the target signal.

In the present embodiment, FSK modulation is ideally selected, preferably to be used in conjunction with a short-range device (TPMS, RKE, SES, garage door opener or the like). In reality, FSK modulation perceives very little of the change in the amplitude of the signal with time. An advantage related to this kind of FSK modulation is that there is a constancy to the envelope of the signal in which data encryption does not exist, unlike ASK modulation, with which there are cases when signal information is completely lost when subjected to strong amplitude modulation.

The receiver according to the present invention, in particular the device 1 for eliminating interference comprises a noise-classifying module 5 and a switching module 6 (for received signals or error signals) assembled prior to demodulation by the demodulation module 7 provided for this purpose, differing on this point from conventional solution methods.

The noise-classifying device 5 explained in detail with reference to FIG. 5 can detect and classify various types of noise or interference included in the received communication signal r(t). The switching module 6 explained in detail with reference to FIG. 9 can switch input of the demodulation module 7 between the switched signal r(t) and an error signal e(t).

Figure 5:
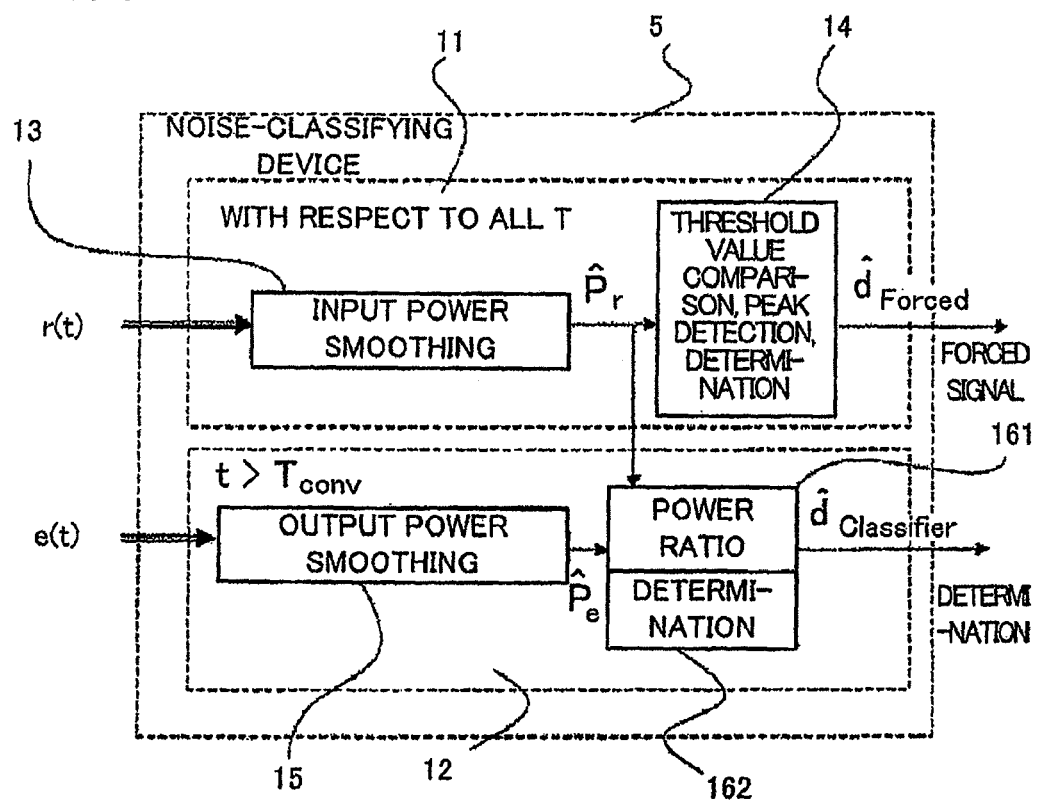
FIG. 5 shows a noise-classifying device according to a preferred embodiment of the present invention.

FIG. 5 shows the noise-classifying device 5 according to the preferred embodiment of the present invention.

The noise-classifying device 5 according to this preferred embodiment is composed so as to detect and classify intermittent interference signals and incoherent interference signals. However, it can be seen that it is possible to provide a noise-classifying device that can detect and classify only intermittent interference signals or only incoherent interference signals.

For this reason, the noise-classifying device includes a first component 11 for receiving by input the complex signal r(t) in the basic passband, and a second component 12 for receiving the error complex signal e(t) sent to the output of the adaptive Wiener filter.

The first component 11 receiving the signal r(t) is constantly used for detecting intermittent interference signals, and supplying a forced signal $d_{Forced}$ as output for accelerating convergence of the adaptive filter when an intermittent interference signal has been detected. Consequently, in the first step a first submodule 13 of the first component 11 computes a power-smoothing signal $$\hat{P}_r \quad \text{[Formula 1]}$$

for the input signal r(t). In the second step, a second submodule 14 compares this power-smoothing signal $$\hat{P}_r \quad \text{[Formula 2]}$$

with a predetermined noise-erasing threshold value. Next, in the third step, the submodule 14 detects the periodicity of the peaks of the rising surface and the falling surface of the power of the input signal of intermittent interference signals that exist depending on the case, by computing the signal difference between two consecutive digital samples of received communication signals. In this manner, when intermittent interference signals are detected, the output of the detection module is controlled so as to show that a target signal does not exist at all ($DET_{Message}$="OFF"), and the output of the switching module supplies to the demodulation module the error signal e(t) that is the output of the adaptive filter.

The second component 12 of the noise-classifying device is composed so as to detect incoherent interference signals in communication signals received after convergence of the filter ($t > T_{CONV}$). Consequently, by using two power-smoothing signals, namely $$\hat{P}_r \quad \text{[Formula 3]}$$

sent from the received communication signal r(t) on the one hand and $$\hat{P}_e \quad \text{[Formula 4]}$$

sent from the error signal e(t) after convergence of the adaptive filter on the other hand, the noise-classifying device 5 then computes the power ratio in a submodule 161, determines on the basis of this ratio whether or not an incoherent interference signal exists in a determination submodule 162, and the output signal $d_{Classifier}$ supplies a noise classification determination ("coherent" or "incoherent").

The power of the received signal $P_r$ and the power of the error signal $P_e$ are determined by the following equations.

$$P_r(t)=|r(t)|^2 \qquad (2)$$

$$P_e(t)=|e(t)|^2 \qquad (3)$$

Here || means the absolute value of a complex number. By smoothing these two powers, the following is obtained.

[Formula 5]

$$\hat{P}_r(t)=(1-\mu_r)\hat{P}_r(t-1)+\mu_r|r(t)|^2 \qquad (4)$$

$$\hat{P}_e(t)=(1-\mu_e)\hat{P}_e(t-1)+\mu_e|e(t)|^2 \qquad (5)$$

Here, $\mu_e$ and $\mu_r$ mean forgetting factors.

The estimated power ratio is determined as follows.

[Formula 6]

$$\hat{R}(t) = \frac{\hat{P}_e(t)}{\hat{P}_r(t)} \qquad (6)$$

In the embodiment shown in FIG. 5, the noise-classifying device 5 can identify intermittent interference signals and incoherent interference signals, and implementation of a noise-classifying device capable of detecting only one out of these two interference signals can be wholly considered, as has already been stated.

Next, operation of a noise-classifying device corresponding to the type of interference existing in received communication signals will be explained in detail.

Detection of Intermittent Interference Signals

The role of the first component of the noise-classifying device is to detect as quickly as possible intermittent interference with the aim of accelerating convergence of the adaptive filter. Here, the focus is only on detecting the behavior of intermittent interference, and the focus is not on identifying the interference pattern.

Figure 6A:
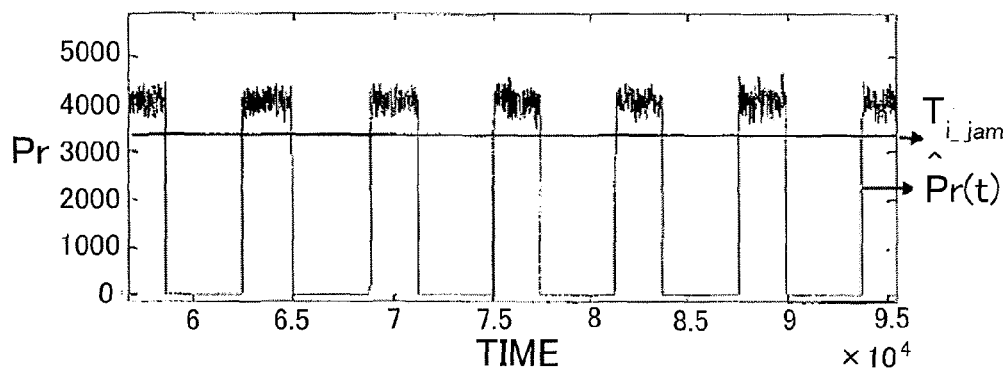
FIG. 6A shows one example of a graph showing the power of an intermittent interference signal.

FIG. 6A shows the power of an intermittent interference signal. For example, in the short-term initialization phase, after the energy threshold value $T_{i\_jam}$ is determined or estimated to be 3400, the system operates so as to detect various coherent or intermittent interference signals with various DU or so as to detect incoherent noise by various signal-to-noise ratios. At each time t, the smoothed power signal $$\hat{P}_r \quad \text{[Formula 7]}$$

and the predetermined energy threshold value $T_{i\_jam}$ are compared on the basis of digital samples received from the communication signal.

[Formula 8]

$$x(t)=\hat{P}_r(t)<T_{i\_jam} \qquad (7)$$

Next, the peaks of the rising surfaces and the falling surfaces of the signal x(t) are detected using the difference in two consecutive samples.

$$\text{diff}(t)=x(t+1)-x(t) \qquad (8)$$

Figure 6B:
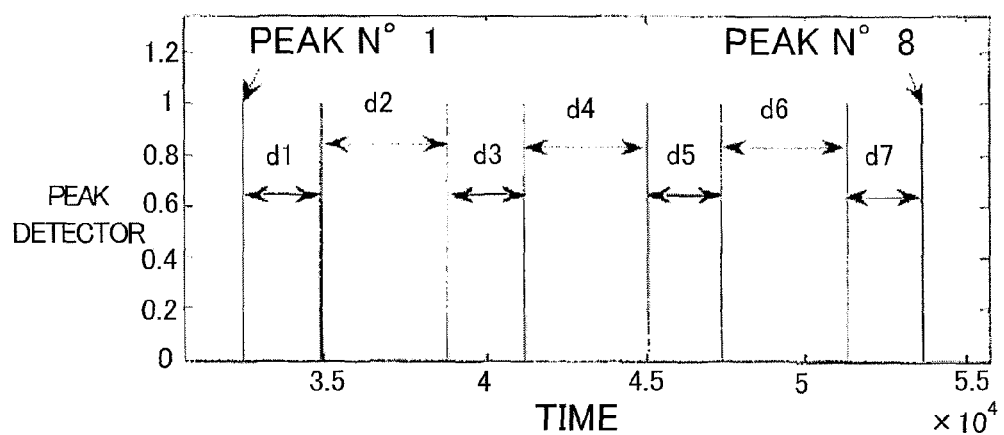
FIG. 6B shows one example of a graph showing the peak detected in the rising surface and the falling surface of the input signal power.

Another method for detecting peaks is to directly detect the rising surfaces and falling surfaces with the signal x(t), as can be seen from FIG. 6B, which shows detected peaks.

From the signals in FIG. 6B, the noise-classifying device finds the recurring position of the peaks by computing the various consecutive times $d_{2i-1}$ and $d_{2i}$ for $1<i<N_{PWM}$ ($N_{PWM}$ is the number of iterations of pulse modulation in the continuation time). For a type of intermittent interference other than the AM (amplitude modulation) or ASK (amplitude-shift keying modulation) type, the consecutive times $d_{2i-1}$ and $d_{2i}$ are the same as long as the usage factor is roughly 50%.

When the iterative pattern is detected in at least three consecutive patterns ($N_{PWM}=3$), the output signal $d_{Forced}$ of the noise-classifying device is switched to "ON" and this means that convergence of the adaptive filter is forced with respect to a constant continuation time ($T_{Forced}$) and in addition the detection module does not stop coefficient updating of the filter, and in this case, the signal $DET_{Message}$ is forced to "OFF".

Detection of Incoherent Interference Signals

The second component 12 of the noise-classifying device is used only after convergence of the adaptive filter ($t>T_{conv}$), and from that instant, the ratio $$\hat{R} \quad \text{[Formula 9]}$$

of the smoothed power signal is estimated and the output signal $d_{Classifier}$ that supplies the determination of the noise-classifying device is updated. For example, the convergence time $T_{CONV}$ of the filter selected from less than 3,000 samples is determined on the basis of the maximum number of interference signals the filter can remove. Stated another way, the coefficient number of the filter is related to this maximum number.

Figure 7:
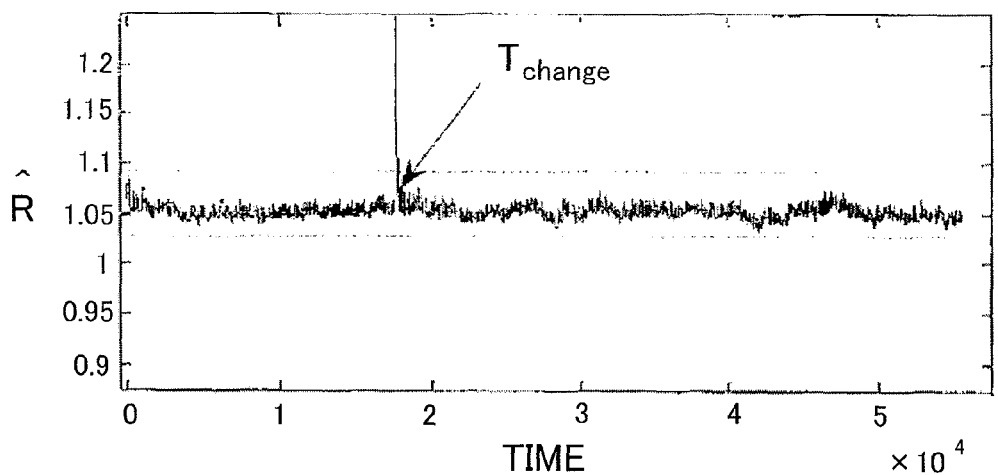
FIG. 7 is a graph showing the smoothed power signal ratio for an incoherent interference signal.

FIG. 7 is a graph showing the ratio of the smoothed power signal of the incoherent interference signal (white noise) to the error signal in accordance with the first embodiment, occurring in succession with two different signal-to-noise ratios (SNR) modified at the instant $T_{Change}$. With the example shown here, the interference signal is a white noise type whose signal-to-noise ratio fluctuates (there are no other jamming signals). In this figure, the power ratio $$\hat{R} \quad \text{[Formula 10]}$$

is close to 1 with a prescribed margin, and at the time of change in the signal-to-noise ratio (from −10 dB to 0 dB in this embodiment), there is a visible transient interval at the estimated power ratio. When the power ratio is close to 1, the output signal $d_{Classifier}$ indicates the presence of an incoherent interference signal ($d_{Classifier}=$"incoherent").

Figure 8:
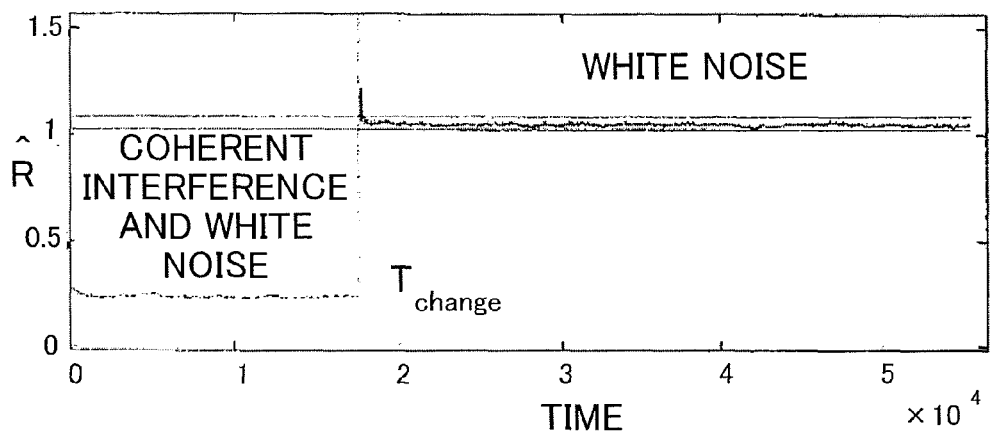
FIG. 8 is a graph showing the smoothed power signal ratio for a signal in which coherent interference and incoherent interference are mixed.

FIG. 8 is a graph showing the estimated power ratio according to the second embodiment. In this example, two impediments exist, and initially there is a coherent interference signal (SNR=0 dB) accompanying additional white noise and next there is a unitary additional white noise (SNR=0 dB).

First, because the coherent interference signal exists accompanying the additional white noise, the estimated power ratio is neither close to 1 (as in the case of white noise alone) nor close to zero (as in the case when the signal-to-noise ratio is high). In this embodiment, the estimated power ratio is around 0.25. Next, when the additional white noise is a unitary impediment that exists after the instant $t=T_{change}$, the estimated power ratio $$\hat{R}$$ [Formula 11]

is close to 1 and thus the output signal of the noise-classifying device $d_{Classifier}$ is "incoherent".

With respect to coherent interference signals, as long as the adaptive filter is well suited to removing this, the estimated power ratio $$\hat{R}$$ [Formula 12]

becomes close to 0 (for example, when the SNR is large with respect to the additional white noise), and as a result the output signal $d_{Classifier}$ indicates "coherent".

Furthermore, when the final determination of the noise-classifying device is uncertain, the signal $d_{Classifier}$ is set to "coherent" by default.

Figure 9:
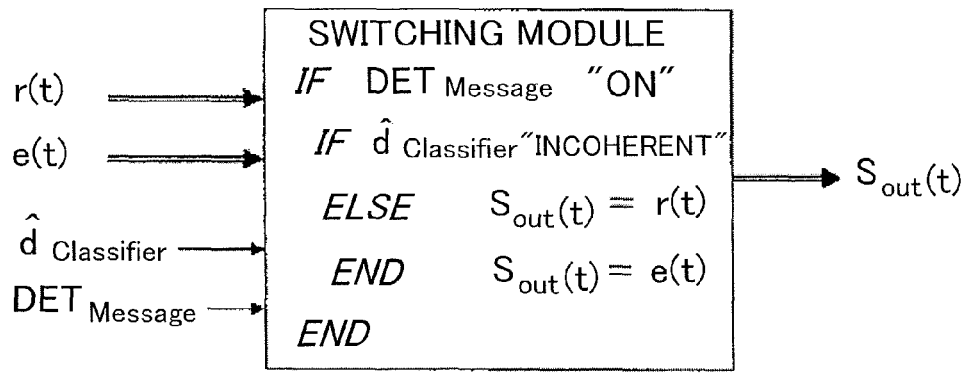
FIG. 9 shows a switching module.

FIG. 9 shows the switching module of the receiver of FIG. 4. The switching module receives various signals as input, as shown below.

Complex signal received at basic passband (r(t)),
Determination by noise-classifying device ($d_{Classifier}$),
Error complex signal (e(t)) and
Detection module signal ($DET_{Message}$).

The switching module determines which signal ($S_{out}(t)$) to use for demodulation in accordance with the signal received by input.

The table below (Table 1) is a compilation of the states of the two output signals $d_{Forced}$ and $d_{Classifier}$ from the noise-classifying device in accordance with the various impediment signals existing in the received communication signal r(t), and the output status $S_{out}(t)$ of the switching module for demodulation in accordance with the absence or presence of the target signal ($DET_{Message}$).

This table shows several examples of noise and interference, but other combinations are also possible.

TABLE 1

| Noise/Interference | $d_{Forced}$ | $d_{Classifier}$ | $DET_{Message}$ | $S_{out}(t)$ |
|---|---|---|---|---|
| Intermittent interference | ON (Forces filter coefficient updating during continuation time $T_{Forced}$) | Coherent | OFF (during continuation time $T_{Forced}$) | e(t) |
| Incoherent noise | OFF | Incoherent | Free | r(t) |
| Coherent noise or coherent interference | OFF | Coherent | Free | e(t) |

Prior to the convergence time ($T_{CONV}$) of the adaptive filter, the signal $s_{out}(t)=e(t)$.

Furthermore, when an intermittent interference signal is detected and the forced signal $d_{Forced}$ is forced to "ON", for example, convergence of the adaptive filter is forced over limited continuation times and in this case the detection becomes "ON" due to the intermittence of the interference, while the $DET_{Message}$ signal is blocked to OFF and the halting of filter convergence is avoided. In this manner, convergence is accelerated.

With another embodiment, when the target signal is detected ($DET_{Message}$="ON") and the output signal from the noise-classifying device indicates that incoherent noise has been detected ($d_{Classifier}$="incoherent"), the received communication signal r(t) is sent to the demodulation module.

Figure 10:
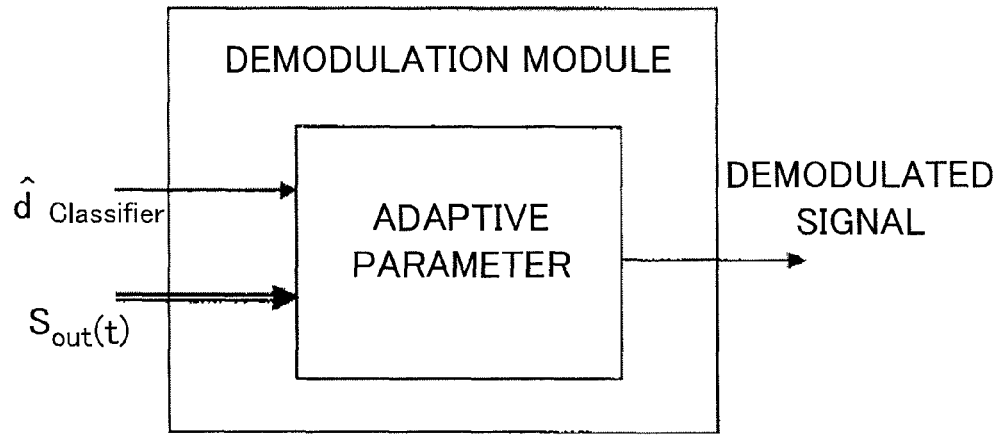
FIG. 10 shows a demodulation module.

FIG. 10 shows the demodulation module. The demodulation module restores the original message s(t). The demodulation module receives through input the signal $S_{out}(t)$ supplied from the switching module and the classification determination $d_{Classifier}$ from the noise-classifying device, and supplies a demodulated signal as output. Advantageously, the demodulation module includes a plurality of standards adaptable on the basis of the "coherent" or "incoherent" classification accomplished by the noise-classifying device. Consequently, modulation of a special parameter (correlated smoothing parameter or initialization of angle of rotation, etc.) is accomplished so as to adapt demodulation in accordance with the various types of detected noise.

It should be apparent that the various embodiments of the invention described in the Disclosure may be modified and/or improved by one skilled in the art without departing from the scope of the invention defined by the attached Claims.

The invention claimed is:

1. A device for reducing interferences in a received communication signal, comprising:
    an adaptive filter using a self-reference signal, for removing coherent and stable interference signals from the received communication signal;
    a detection module for detecting the presence of a target signal in a filter signal received from the adaptive filter;
    a demodulation module for demodulating the received communication signal when the target signal is detected by the detection module;
    a control module for controlling the adaptive filter so that the target signal is not sensed and removed by the adaptive filter;
    a noise-classifying device for detecting interference signals in the received communication signal, including incoherent interference signals, and determining a noise classification of the detected interference signals, the noise-classifying device receiving the received communication signal and the filter signal; and
    a switching module for selecting a demodulation module input signal from the received communication signal and the filter signal on the basis of a determination of the noise-classifying device and a value detected for the absence or presence of the target signal;
    wherein the demodulation module can adapt in accordance with the determination of the noise-classifying device;
    wherein the noise-classifying device is composed so as to detect intermittent interference signals, and to supply, when an intermittent interference signal is detected, as output over a limited continuation time a forced signal so as not to halt convergence of the adaptive filter;
    wherein the received communication signal exhibits the shape of a digital sample; and
    the noise-classifying device compares a smoothed power signal of the received communication signal and a predetermined noise-erasing threshold value, computes the signal difference between two consecutive digital samples and detects the periodicity of the peaks of the intermittent interference signals.

2. The device according to claim 1, wherein the output of the detection module is forced over limited continuation time so as to show that the target signal does not exist and to inhibit instructions for detection of the target signal by an intermittence of interference, when the intermittent interference signal is detected; and
    a signal used for demodulation by the demodulation module is supplied at the output of the switching module.

3. The device according to claim 1, wherein the noise-classifying device computes a power ratio by using two smoothed power signals of the received communication signal and an error signal after convergence of the adaptive filter, and determines whether or not an incoherent interference signal exists on the basis of the power ratio.

4. The device according to claim 1, wherein the switching module selects a signal used for demodulation by the demodulation module after receiving the detected value and the determination of the noise-classifying device.

5. The device according to claim 4, wherein the demodulation module is adapted by modulation parameters on the basis of a signal received from the switching module.

6. A communication signal receiver including the device according to claim 1.

7. The receiver according to claim 6, wherein the receiver is composed as an on-board receiver in order to receive signals from remote control transmitters.

8. The receiver according to claim 7, wherein the receiver is provided in a vehicle.

9. A signal processing method for reducing interferences in a received communication signal, comprising:

removing coherent and stable interference signals from the received communication signal by adaptive filtering, by using a self-reference signal;

detecting the presence of a target signal in the received communication signal;

controlling the filtering step so that the target signal is not sensed and removed by adaptive filtering;

demodulating the received communication signal when the target signal is detected;

detecting various interference signals in the received communication signal, including incoherent interference signals, and determining a noise classification of the detected interference signals;

selecting a demodulation target input signal on the basis of the determination of the noise classification and the value detected for the absence or presence of the target signal; and causing the demodulation step to be adapted in accordance with said determination of the noise classification;

wherein intermittent interference signals are detected and, when an intermittent interference signal is detected, a forced signal is output over a limited continuation time, so as not to halt convergence of the adaptive filtering;

wherein the received communication signal exhibits the shape of a digital sample; and a smoothed power signal of the received communication signal and a predetermined noise-erasing threshold value are compared, the signal difference between two consecutive digital samples is computed, and the periodicity of the peaks of the intermittent interference signals is detected.

* * * * *